(12) United States Patent
Pastore et al.

(10) Patent No.: US 11,867,331 B2
(45) Date of Patent: Jan. 9, 2024

(54) FEMALE ELEMENT OF A QUICK CONNECTOR, AND QUICK CONNECTOR COMPRISING SUCH A FEMALE ELEMENT AND AN ASSOCIATED MALE ELEMENT

(71) Applicant: STAUBLI FAVERGES, Faverges-Seythenex (FR)

(72) Inventors: Olivier Pastore, Ugine (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/688,088

(22) Filed: Mar. 7, 2022

(65) Prior Publication Data

US 2022/0290787 A1     Sep. 15, 2022

(30) Foreign Application Priority Data

Mar. 9, 2021   (FR) ...................................... 2102277

(51) Int. Cl.
   *F16L 37/138*   (2006.01)
   *F16L 37/084*   (2006.01)
   (Continued)

(52) U.S. Cl.
   CPC ......... *F16L 37/138* (2013.01); *F16L 37/0842* (2013.01); *F16L 37/34* (2013.01); *F16L 37/38* (2013.01)

(58) Field of Classification Search
   CPC ... F16L 37/0842; F16L 37/32; F16L 37/0841; F16L 37/086; F16L 37/22; F16L 37/138; F16L 37/23
   See application file for complete search history.

(56) References Cited

U.S. PATENT DOCUMENTS 1,098,265 A * 5/1914 James ................. F16L 37/0841
                                                         285/317
2,092,116 A * 9/1937 Hansen .................... F16L 37/22
                                                         251/149.6

(Continued)

FOREIGN PATENT DOCUMENTS

CA      2484531 A1 *  5/2005  ............ F16L 37/086
DE       489610 C  *  1/1930

(Continued)

OTHER PUBLICATIONS

French Search Report dated Nov. 12, 2021, for French Application No. 2102277 filed Mar. 9, 2021, 2 pages.

*Primary Examiner* — Zachary T Dragicevich
*Assistant Examiner* — James A Linford

(57) ABSTRACT

This female element of a quick connector that connects to a male element and has a hollow body, which extends along an insertion axis and which delimits a receiving volume for the male element. Radial openings, formed in the body along a radial axis, open into the receiving volume. Each radial opening receives a latch, translatable in relation to the body along the corresponding radial axis, between a locked and an unlocked position. The female element has an actuating ring arranged about the body and translatable between a locked and an unlocked position. The ring has guide grooves, which interact with pins of each latch. The guide grooves associated with each latch are geometrically carried by a guide plane inclined in relation to the insertion axis so that each latch is driven between its locked and unlocked positions when the actuating ring is moved between its locked and unlocked positions.

12 Claims, 14 Drawing Sheets

(51) Int. Cl.
*F16L 37/34* (2006.01)
*F16L 37/38* (2006.01)

(56) References Cited

U.S. PATENT DOCUMENTS

| | | | | |
|---|---|---|---|---|
| 2,344,740 A | * | 3/1944 | Shaff | F16L 37/40 |
| | | | | 285/280 |
| 2,413,978 A | * | 1/1947 | Krone | F16L 37/22 |
| | | | | 285/280 |
| 2,433,119 A | * | 12/1947 | Hansen | F16L 37/22 |
| | | | | 251/149.6 |
| 3,188,123 A | * | 6/1965 | Hansen | F16L 37/22 |
| | | | | 285/341 |
| 3,709,528 A | * | 1/1973 | Cruse | F16L 37/42 |
| | | | | 285/330 |
| 4,216,982 A | * | 8/1980 | Chow | F16L 37/22 |
| | | | | 285/423 |
| 2007/0278791 A1 | * | 12/2007 | Tiberghien | F16L 37/42 |
| | | | | 285/315 |
| 2018/0180208 A1 | | 6/2018 | Tiberghien et al. | |
| 2020/0056732 A1 | * | 2/2020 | Pai | F16L 37/40 |

FOREIGN PATENT DOCUMENTS

| | | | | | |
|---|---|---|---|---|---|
| EP | 1298378 | A2 | * | 4/2003 | F16L 37/22 |
| EP | 1557599 | A1 | | 7/2005 | |
| FR | 1037087 | A | * | 9/1953 | |
| FR | 2620193 | A1 | * | 3/1989 | |
| FR | 2890719 | A1 | * | 3/2007 | F16L 37/23 |

* cited by examiner

FEMALE ELEMENT OF A QUICK CONNECTOR, AND QUICK CONNECTOR COMPRISING SUCH A FEMALE ELEMENT AND AN ASSOCIATED MALE ELEMENT

CROSS-REFERENCE TO RELATED APPLICATIONS

This application claims priority to French Patent application no. 2102277, filed Mar. 9, 2021, the contents of which are incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a female element of a quick connector, and to a quick connector comprising such a female element and a related male element.

Description of Related Art

Quick connectors are fluid connection devices comprising a female element and associated male element. Each of the male and female elements comprises an internal passage, the internal passages being in fluid communication when the connector is in a connected configuration. The female element typically comprises a locking device, which automatically engages upon connection of the male and female elements, so as to maintain the connector in a connected configuration, hence the name of quick connector.

When the fluid flowing through the quick connector is under pressure, this pressure tends to push the male element away from the female element, mechanically stressing the locking device. In order to improve connection security and avoid unintentional disconnection, especially in the case of very high-pressure quick connectors, it is known to equip the quick connectors with a secure locking device.

EP-A-1 557 599, for example, describes a female element of a quick connector equipped with a secure locking device. The female element comprises locking balls, which are pushed by a actuating ring into a first position in which the balls interact with a peripheral groove of the male element. The actuating ring, which is itself pushed into its locked position by a first spring, is also locked in its locked position by a second latch, loaded by a second spring. Therefore, in order to disconnect the male and female elements, it is necessary to first release the second latch, to move the actuating ring away from its locked position, and then release the locking balls. This secure locking device is bulky and relatively complex to manufacture, and therefore expensive.

BRIEF SUMMARY OF THE INVENTION

These problems are more particularly addressed by the invention, which proposes a female element of a quick connector that offers improved security against unintentional disconnection while remaining compact and simple to manufacture.

To this end, the invention relates to a female element of a quick connector configured to connect to a male element, the female element comprising:
  a body that extends along an insertion axis and comprises:
    a volume for receiving the male element, the receiving volume having a shape of revolution about the insertion axis and opening out of the body through a mouthpiece located in a transverse plane orthogonal to the insertion axis, the mouthpiece defining a front side of the female element,
    radial openings, arranged in the body along a radial axis orthogonal to the insertion axis, which open into the receiving volume,
  at least one latch, each latch being received in a respective radial opening and being movable in translation in relation to the body along the corresponding radial axis, between a first position, in which this latch penetrates into the receiving volume, and a second position, in which this latch does not penetrate into the receiving volume, each latch comprising a proximal face oriented on the side opposite to the first mouthpiece,
  a actuating ring, arranged around the body coaxially to the insertion axis and movable in translation in relation to the body along the insertion axis, between a locked position and an unlocked position,
  a return member, configured to return the actuating ring to its locked position.

According to the invention, the actuating ring comprises guide grooves which interact with pins of each latch extending in a direction orthogonal to the radial axis of the corresponding radial opening, the guide grooves associated with each latch being geometrically carried by a guide plane inclined in relation to the insertion axis, so that:
  each latch is driven from its second position to its first position when the actuating ring is moved from its unlocked position to its locked position, and
  each latch is driven from its first position to its second position when the actuating ring is moved from its locked position to its unlocked position.

By means of the invention, the latch is returned to its first position by means of the actuating ring's return member to its locked position. This keeps the quick connector compact and economical. When the quick connector is connected and under pressure, the repelling forces tending to uncouple the connector are applied to the latches and are fully taken up by the walls of the radial openings, thus reducing the risk of unintentional disconnection.

According to advantageous but non-mandatory aspects of the invention, such a female element may incorporate one or more of the following features taken alone or in any technically permissible combination:

The guide grooves move away from the insertion axis as they approach the front of the female element, the unlocked position of the actuating ring being an axially retracted position along the insertion axis from the locked position.

The guide grooves approach the insertion axis as they approach the front of the female element, with the locked position of the actuating ring being an axially retracted position along the insertion axis from the unlocked position.

Each guide plane is inclined in relation to the insertion axis by an angle of inclination of between 300 and 60°, preferably between 40° and 50°, more preferably equal to 450.

The proximal face of each latch is substantially planar and parallel to a transverse plane, the proximal face being in surface contact with a rear face of the corresponding radial opening.

A width of the proximal face of each latch equal to the length of the projection on the transverse plane of the proximal face of that latch, measured in a direction orthoradial to the insertion axis, is greater than the mouthpiece radius.

Each latch comprises an inner face, oriented toward the insertion axis, comprising a flared portion oriented both toward the insertion axis A100 and toward the mouthpiece.

The invention also relates to a quick connector, comprising a female element as previously defined, and a male element configured to be connected to said female element, wherein:

the male element comprises a hollow body with a shape generally of revolution about a main axis, the hollow body comprising a distal portion that is intended to be received in the receiving volume of the female element, the body of the male element delimiting a fluid passage that opens out of the distal portion through a second mouthpiece, the second mouthpiece defining a front side of the male element, the distal portion comprises, moving away from the second mouth, a first cylindrical portion, a flared portion, in particular a conical portion, and a second cylindrical portion, the flared portion being arranged projecting in relation to the first cylindrical portion and to the second cylindrical portion, the flared portion forms a flange with a front face and a rear face, of which:
  the front face is oriented towards the second mouthpiece and diverges on moving away from the second mouthpiece, the front face being configured to push each latch from its first position to its second position when the male element penetrates into the female element, during a press-fitting movement of the male element into the receiving volume of the female element,
  the rear face connects the front face to the second cylindrical portion and is oriented away from the second mouthpiece, when the quick connector is in a connected configuration in which the male element is received in the volume receiving the female element, the insertion axis is coincident with the main axis, the actuating ring is in the locked position and each latch is in its first position, with the rear face of the collar facing the proximal face of each latch.

According to advantageous but non-mandatory aspects of the invention, such a quick connector may incorporate one or more of the following features taken alone or in any technically permissible combination:

the rear face of the flange comprises a first outer portion and a first inner portion, which is radially closer to the main axis than the first outer portion and which connects the outer portion to the second cylindrical portion, the first outer portion defines a first ring-shaped outer face centered on the major axis and located in a plane orthogonal to the major axis, the first inner portion comprises a first groove that is recessed in the first inner portion and which comprises a bottom and two radial edges facing each other, the bottom of the first groove defines a first ring-shaped internal face centered on the main axis and located in a plane orthogonal to the main axis, the one of the two radial edges that connects the first inner face and the first outer face defines a first security face, which is geometrically held by a cylinder of circular cross-section centered on the main axis and which is oriented towards the main axis the proximal face of each latch has a profile complementary to the rear face of the flange and comprises a second external face, a second inner face and a second security face, of which:
  the second outer face has a ring portion shape centered on the insertion axis and located in a plane orthogonal to the insertion axis,
  the second inner face is located in a plane orthogonal to the insertion axis and set back from the second outer face in relation to the mouthpiece of the female element,
  the second security face is located between the second outer face and the second inner face and is oriented away from the insertion axis, when the quick connector is in its connected configuration:
  the first outer face is opposite the second external face,
  the first inner face faces the second inner face,
  when one of the first outer or inner face is in contact with the respective second outer or inner face, then the first security face is in contact with the second security face, preventing the latches from moving from their first position to their second position.

For each latch, a second groove is recessed in the second inner portion of the proximal face, the second groove comprising a bottom and two radial edges located opposite each other, the bottom of the groove having the ring shaped portion centered on the insertion axis when the latch is in its first position while the two edges each have the shape of a cylinder portion of circular section centered on an axis parallel to the insertion axis, while the bottom defines the second internal face, while the one of the two radial edges that is oriented away from the insertion axis defines the second security face, and that when the quick connector is in a connected configuration, the second outer face rests on the first external face.

For each latch, a second groove is recessed in the second inner portion of the proximal face, the second groove comprising a bottom and two radial edges located opposite each other, the bottom of the groove having the ring-shaped portion centered on the insertion axis when the latch is in a first position while the two edges each have the shape of a portion of a cylinder of circular section centered on an axis parallel to the insertion axis, while the bottom defining the second internal face, whereas the one of the two radial edges oriented away from the insertion axis defines a second security face, and that when the quick connector is in a connected configuration, the second inner face rests on the first internal face.

For each latch, an insert is located in the second inner portion of the proximal face of the latch, the insert projecting from the second outer portion, wherein the insert has a side face, facing away from the insertion axis, and a rear face, facing away from the mouthpiece of the female element, and wherein the side face of the insert is the second security face of the latch, while the rear face of the insert is the second inner face of the latch.

BRIEF DESCRIPTION OF THE SEVERAL VIEWS OF THE DRAWINGS

The invention will be better understood, and other advantages thereof will become clearer in the light of the following description of four embodiments of a female element of a quick connector, as well as of a quick connector comprising such a female element and a related male element, in accordance with its principle, given by way of example only and made with reference to the appended drawings, in which.

DETAILED DESCRIPTION OF THE INVENTION

Figure 1:
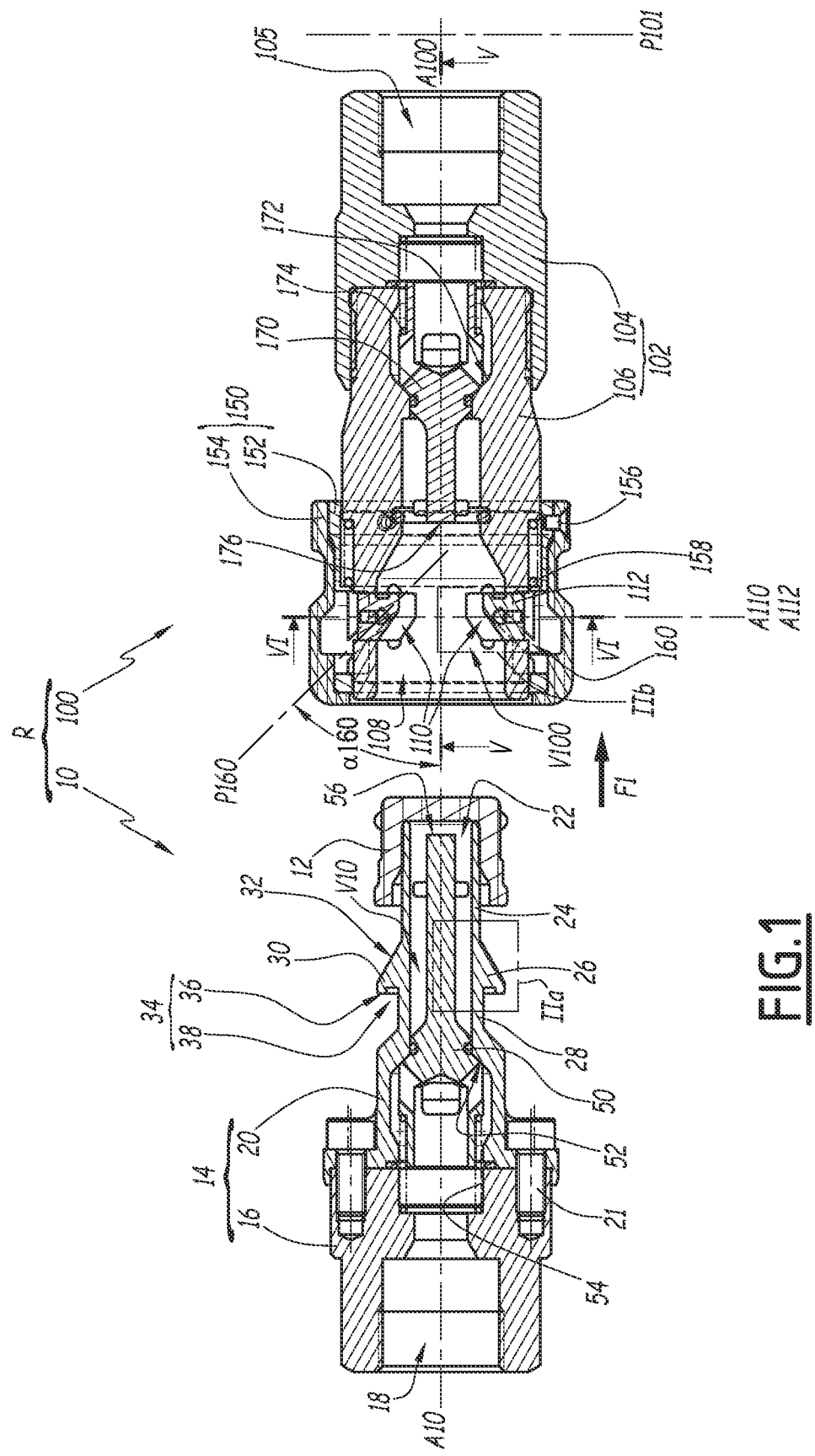
FIG. 1 is a longitudinal section of a quick connector in accordance with a first embodiment of the invention, comprising a female element and a related male element, shown in a first so-called disconnected configuration.
Figure 2:
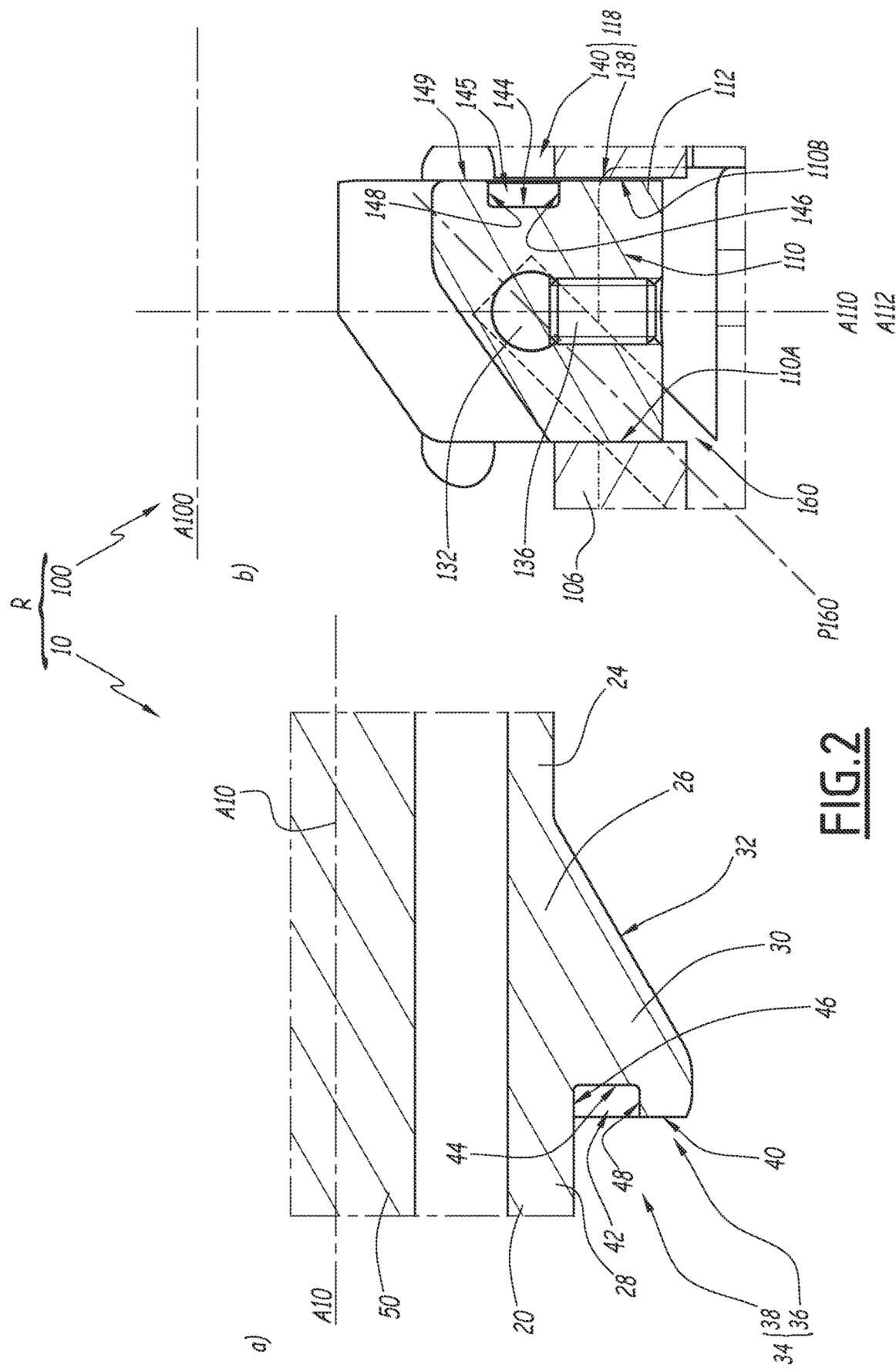
FIG. 2 shows a detail II a) of the male element of the quick connector of FIG. 1 and a detail II b) of the female element of the quick connector of FIG. 1 on two respective inserts a) and b)

FIG. 1 shows a connector R, which comprises a male element 10, on the left side of FIG. 1, and an associated female element 100, on the right side of FIG. 1.

The connector R is shown here in a disconnected configuration, in which the male element 10 and the female element 100 are separated from each other. The male element 10 is further sealed here by a cap 12, which is not portion of the invention and is removed upon connection of the male element 10 with the female element 100.

First, the male element 10 is described.

The male element 10 comprises a body 14, which is hollow and has a generally rotational shape about a main axis A10. The body 14 is here made in two parts, with a proximal portion 16, in which a threaded hole 18 is provided for attaching a fluid line to the male element 10, and a distal portion 20, which is intended to be partially received in a receiving volume of the female element 100. The proximal portion 16 is assembled here to the distal portion 20 by means of screws 21.

The body 14 of the male element 10 delimits a fluid passage V10, which opens out of the distal portion 20 through a mouthpiece 22. In the disconnected configuration of FIG. 1, the mouthpiece 22 is closed by the cap 12.

In the disconnected configuration of FIG. 1, the mouthpiece 22 of the male element 10 is oriented toward the female element 100. By convention, the mouthpiece 22 of the male element 10 is located on a front side of the male element 10, while the threaded hole 18 is located on a rear side of the male element 10.

The distal portion 20 comprises a first cylindrical portion 24, a flared portion 26 and a second cylindrical portion 28, moving away from the mouthpiece 22 toward the rear of the male element 10.

The first cylindrical portion 24 and the second cylindrical portion 28 each have a circular cross-section centered on the main axis A10. The flared portion 26, located between the first cylindrical portion 24 and the second cylindrical portion 28, is provided projecting radially outward from the distal portion, both from the first cylindrical portion 24 and from the second cylindrical portion 28. The flared portion 26 forms a flange 30, which is shown in larger scale in insert a) of FIG. 1. The flange 30 comprises a front face 32, which faces the second mouthpiece 22, and a rear face 34, which connects the front face 32 to the second cylindrical portion 28 and faces away from the mouthpiece 22, i.e. faces the rear of the male element 10.

The front face 32 diverges, moving away from the mouthpiece 22, and here has a frustoconical profile, centered on the main axis A10. The rear face 34 comprises a first outer portion 36 and a first inner portion 38, the first inner portion 38 being radially closer to the main axis A10 than the first outer portion 36. In other words, the first inner portion 38 connects the first outer portion 36 to the second cylindrical portion 28.

The first outer portion 36 defines a first outer face 40, which is ring-shaped centered on the major axis A10 and located in a plane orthogonal to the major axis A10.

The first inner portion 38 comprises a first groove 42, which is recessed in the first inner portion 38. The first groove 42 has a rectangular profile here, in a plane radial to the main axis A10, and comprises a bottom 44 and two respectively radial inner 46 and radial outer 48 edges facing each other.

The radial edges 46 and 48 each have a cylindrical shape with a circular cross-section centered on the main axis A10, a radius of the inner radial edge 46 being smaller than a radius of the outer radial edge 48. In the example, the radius of the inner edge 46 is equal to an outer radius of the second cylindrical portion 28.

The bottom 44 of the first groove 42 defines a second, ring-shaped inner face centered on the major axis A10 and lying in a plane orthogonal to the major axis A10.

The outer radial edge 48 connects the first outer face 40 and the bottom 44 and defines a first security face. The first security face is geometrically carried by a cylinder of circular cross-section centered on the main axis A10 and is oriented toward the main axis A10.

Advantageously, the male element 10 comprises a valve 50, which is housed in the fluid passage V10. The valve 50 is translatable along the main axis A10 between a closed position, in which the valve 50 abuts against a seat 52 provided in the body 14 of the male element 10 and closes the fluid passage V10, and an open position, in which the valve 50 does not close the fluid passage V10. In FIG. 1, the valve 50 is shown in the closed position.

The male element 10 also comprises a spring 54, which acts between a rear face of the valve 50 and an opposing, forward-facing face of the body 14. The spring 54 biases the valve 50 toward its closed position.

On the side of the mouthpiece 22, the valve 50 comprises a first support face 56. The valve 50 is thus configured to move from its closed position to its open position when a force greater than the return force of the spring 54 is exerted on the first support face 56.

The female element 100 of the quick connector R is now described.

The female element 100 comprises a body 102, which has a generally rotationally symmetrical shape about an insertion axis A100. The body 102 here is made in two parts and comprises a proximal portion 104, in which a threaded hole 105 is provided for attaching a fluid line, and a distal portion 106 which is here assembled to the proximal portion by screwing.

The body 102 of the female element 100 is hollow and defines a fluid passage V100, which opens from the distal portion 106 through a mouthpiece 108, which defines a front side of the female element 100. The mouthpiece 108 has a circular shape with a radius R108. The mouthpiece 108 here is located in a transverse plane, i.e. a plane orthogonal to the insertion axis A100. Upon insertion of the female element 100 and the male element 10, the distal portion 20 of the male element 10 passes through the mouthpiece 108 and is received in a forward portion of the fluid passage V100. The fluid passage V100 is thus also a partial receiving volume of the male element 10.

The distal portion 106 of the body 102 comprises two radial openings 110 formed in the body 102 radially to the insertion axis A100 and which open into the receiving volume V100. Each radial opening 110 is centered on its own radial axis A110, each radial axis A110 being an axis orthogonal to the insertion axis A100. In the illustrated example, the two radial openings 110 are diametrically opposed to each other about the insertion axis A100, so that the two radial axes A110 are aligned. The radial axes A110 are located in the cross-sectional plane of FIG. 1.

In the illustrated example, each radial opening 110 has a rectangular cross-section in a plane orthogonal to the corresponding radial axis A110. Each opening 110 comprises a front face 110A, which is carried by a plane orthogonal to axis A100 and which faces the rear of the female element 100, a rear face 110B, which is parallel to and located opposite the front face 110A, as well as two side faces 110C and 110D, which are arranged opposite each other and which are each carried by a plane parallel to the insertion axis A110. In other words, each radial opening 110 has walls that are parallel to the corresponding radial axis A110.

Each radial opening 110 receives a latch 112, each latch 112 being translatable in relation to the body 102 of the female element 100 in a direction parallel to the radial axis A110 of the radial opening 110 in which such latch 112 is received.

Figure 7:
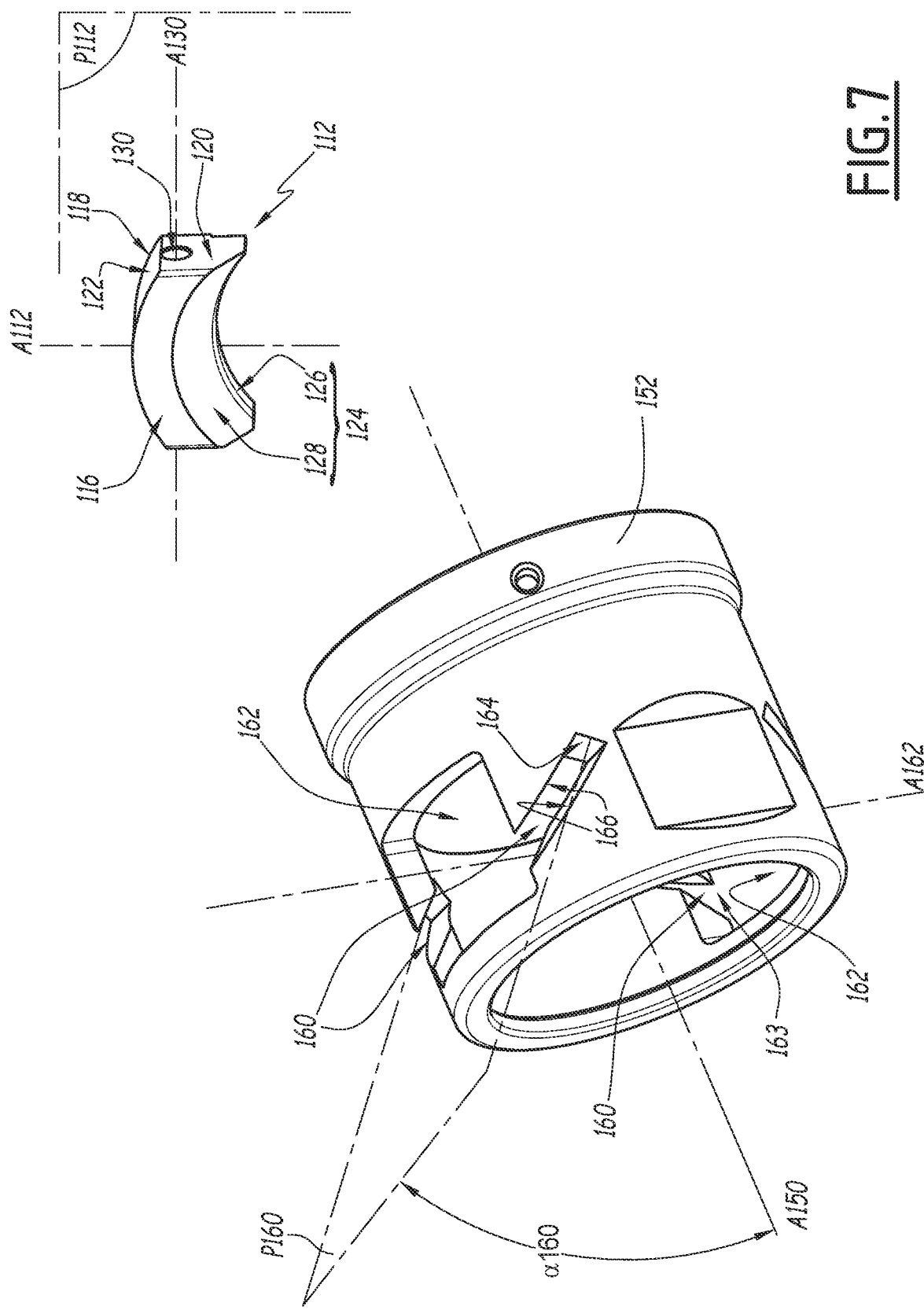
FIG. 7 is an exploded perspective view of two parts of the female element of FIGS. 5 and 6.
Figure 8:
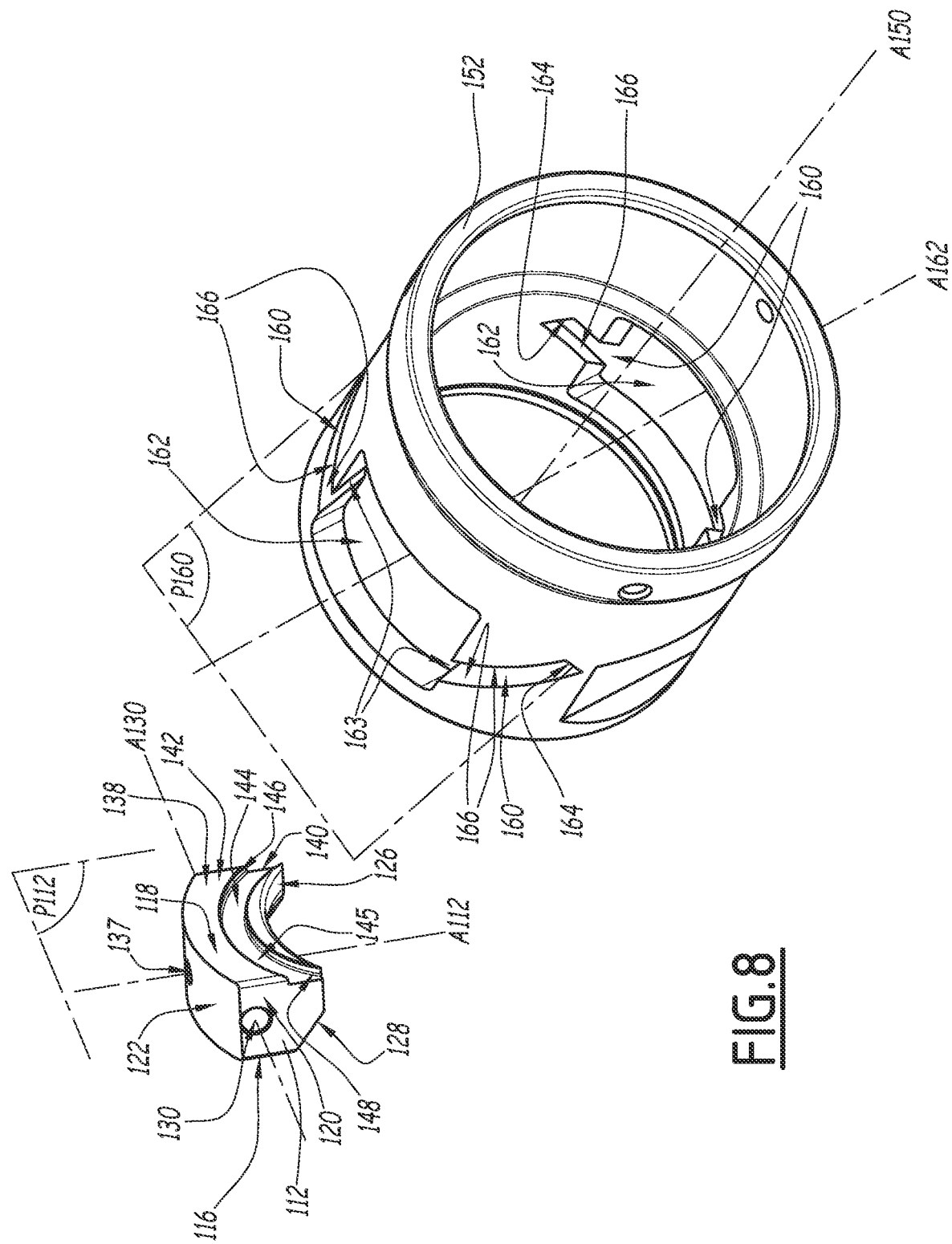
FIG. 8 is an exploded perspective view of the parts of FIG. 7, from a different angle.

A latch 112 is shown in FIGS. 7 and 8.

Each latch 112 has a peripheral surface 114 centered on a latch axis A112. When a latch 112 is received in one of the radial openings 110, the latch axis A112 of that latch is coincident with the radial axis A110 of the corresponding radial opening 110. The peripheral surface 114 is configured to interact with the walls of the radial opening 110, so as to guide the latch 112 received into the corresponding radial opening 110.

In the example, the peripheral surface 114 thus has a cross-sectional rectangular profile in a plane orthogonal to the latch axis A112. The peripheral surface 114 comprises a distal face 116, which is oriented toward the mouthpiece 108 when the latch 112 is received in one of the radial openings 110, a proximal face 118, which is oriented away from the front face and thus oriented away from the mouthpiece 108, the distal face 116 and the proximal face 118 being connected to each other by two side faces 120.

The distal face 116, proximal face 118 and lateral faces 120 are preferably flat. For convenience, a transverse plane P112 of the latch 112 is defined as a plane parallel to the proximal face 118 and containing the axis A112.

In other words, the transverse plane P112 is orthogonal to the insertion axis A100 when the latch 112 is received in the corresponding radial opening 110.

A transverse plane P101 of the female element 100 is also defined as a plane orthogonal to the insertion axis A100.

When the latch 112 is received in a radial opening 110, the distal face 116 and the proximal face 118 of the latch 112 are orthogonal to the insertion axis A100, in other words, parallel to the transverse plane P101 of the female element 100, while the lateral faces 120 are parallel to the insertion axis A100.

In particular, the proximal face 118 of the latch 112 is configured to bear its surface against the rear face 110B of the opening 110, which makes it possible to transmit forces well and makes it possible to produce a compact female element 100 in the axial direction parallel to the insertion axis A100.

For each latch 112, a width L118 of the proximal face 118 is defined as a length, measured in a direction perpendicular to the axis of the latch A112, of the projection of the proximal face 118 on the transverse plane P101. In other words, when the latch 112 is received in the corresponding radial opening 110, the width L118 is measured in a direction orthogonal to the corresponding radial axis A110, i.e. in a direction orthoradial to the insertion axis A100.

The width L118 of each latch 112 is advantageously chosen to be greater than the radius R108 of the mouthpiece 108, so as to ensure a large contact surface between the latch 112 and the flange 30 of the male element 10.

Each latch 112 also comprises an outer face 122 and an inner face 124, oriented away from the outer face 122 along the latch axis A112.

Here, the outer face 122 is a portion of a cylinder of circular cross-section centered on an axis orthogonal to the transverse plane P112 of the latch 112. When the female element 100 is assembled, the outer face 122 is oriented away from the insertion axis A100 and the inner face 124 is oriented toward the insertion axis A100.

The inner face 124 comprises a cylindrical portion 126 and a flared portion 128. The cylindrical portion 126 is a portion of a cylinder of circular cross-section, centered on an axis orthogonal to the transverse plane P112, while the flared portion 128 here is a cone portion centered on an axis orthogonal to the transverse plane P112. In the assembled configuration of the female element 100, the flared portion 128 is oriented both toward the insertion axis A100 and toward the mouthpiece 108 of the female element 100.

The flared portion 128 is configured to interact with the front face 32 of the flange 30 of the male element upon connection of the male element 10 and the female element 100, as described later.

A through bore 130 is provided through each latch 112, with the bore 130 opening into each of the side faces 120 of the latch. The bore 130 is centered on an axis A130, that is parallel to the transverse plane P112 and orthogonal to the lock axis A112. In other words, in the assembled configuration of the female element 100, the axis A130 of the bore 130 is orthoradial to the insertion axis A100.

Figure 6:
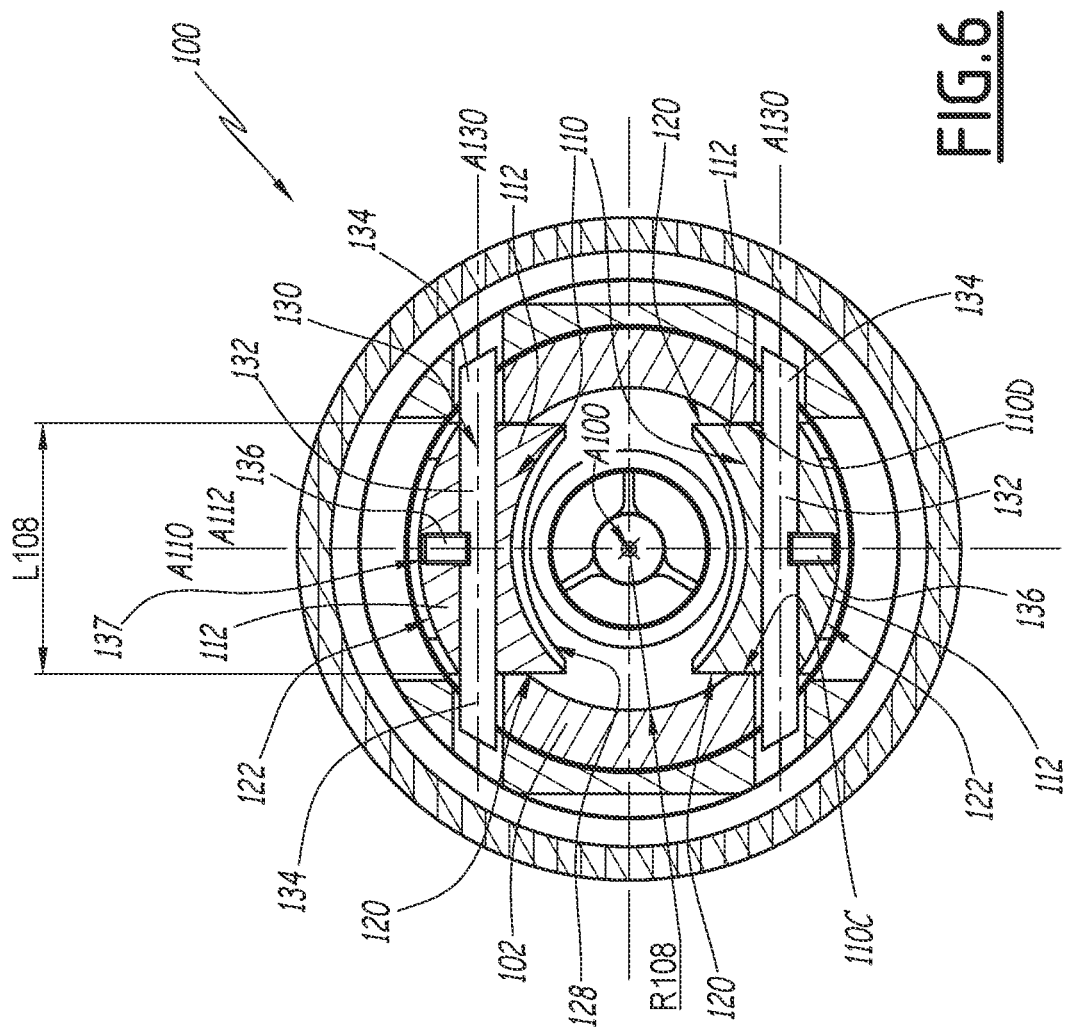
FIG. 6 is a cross-section of the female element of FIG. 1, according to the plane VI in FIG. 1.

Each latch 112 comprises a rod 132, which is not shown in FIG. 7 or 8. The rod 132 is received in the bore 130 and protrudes from each of the side faces 120, so as to form two guide pins 134. The rod 132 is held in the bore 130 by means of a set screw 136 inserted into a threaded hole 137 that opens onto the outer face 122. As seen in FIG. 6, each pin 134 has a beveled end, to reduce the risk of interaction with other elements of the female connector during movements of the latch 112. When the female element 100 is assembled, the pins 134 of each latch 112 thus extend in the direction of the axis A130 of the bore 130, in other words, in a direction orthogonal to the radial axis A110 of the corresponding radial opening 110.

The proximal face 118 of each latch 112 has a profile complementary to the rear face 34 of the flange 30. The proximal face 118 thus comprises a second outer portion 138 and a second inner portion 140, the second inner portion 140 being radially closer to the insertion axis A100 than the second outer portion 138 when the female element 100 is assembled.

The second inner portion 140 comprises a second outer face 144, which is a bottom of a second groove 145 here, recessed into the proximal face 118. The bottom of the second groove 145 is located between a first external axial face 146 and a second internal axial face 148, which are opposite each other.

Here, the second outer face 144 is ring-shaped, centered on the insertion axis A100 when the latch 112 is in its first position. The second outer face 144 is parallel to the transverse plane P112 and is set back from the proximal face 118.

The second outer face 144 here is connected to the proximal face 118 by the first outer axial face 146. The first external axial face 146, which here is a portion of a cylinder of circular cross-section centered on the insertion axis A100 in the assembled configuration of the female element 100, is oriented toward the insertion axis A100.

The second axial face 148, which here has a circular cross-sectional cylinder shape centered on the insertion axis A100, is oriented away from the insertion axis A100 when the female element 100 is in the assembled configuration.

Figure 4:
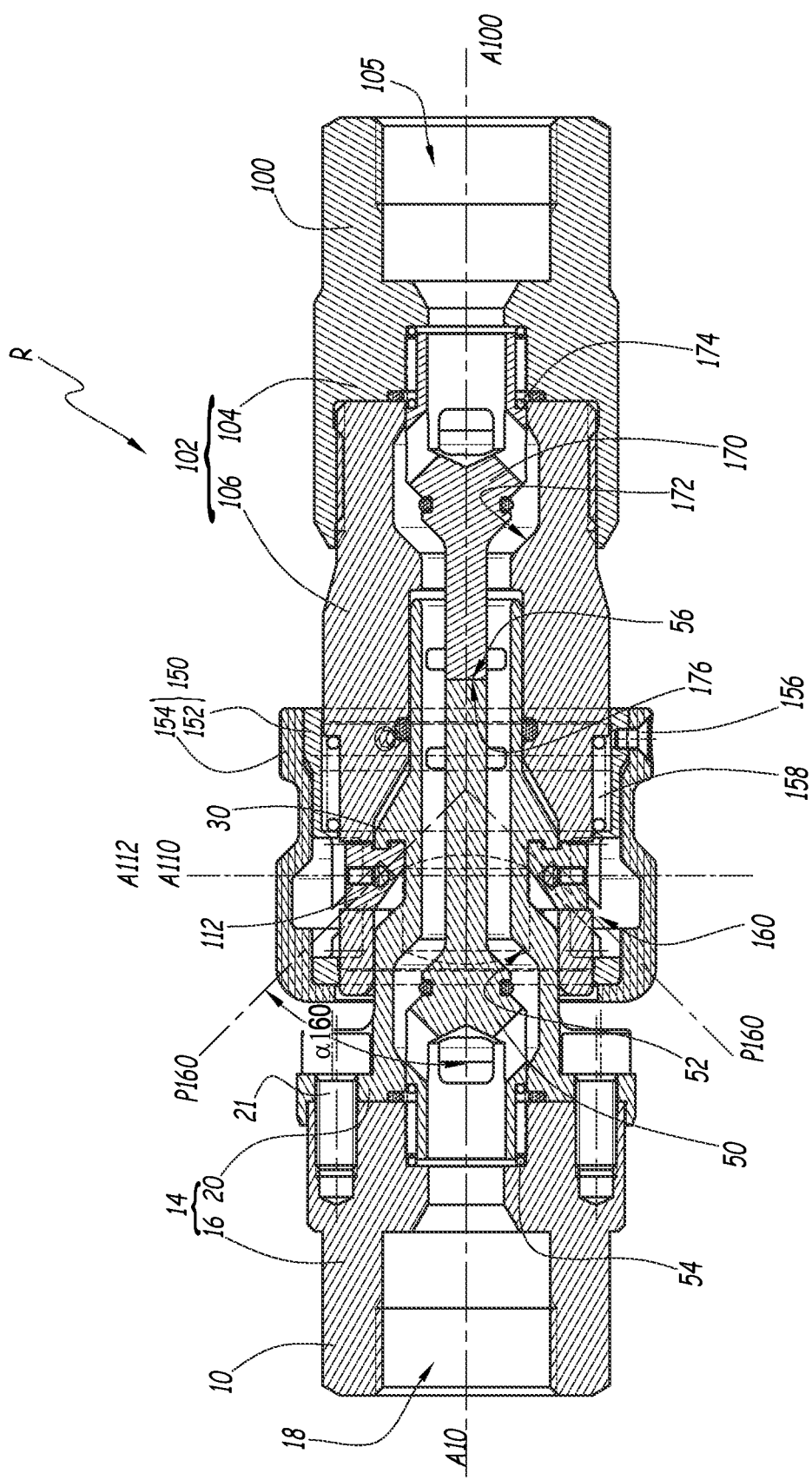
FIG. 4 is a longitudinal section of the quick connector of FIG. 1 in a third so-called connected configuration.
Figure 5:
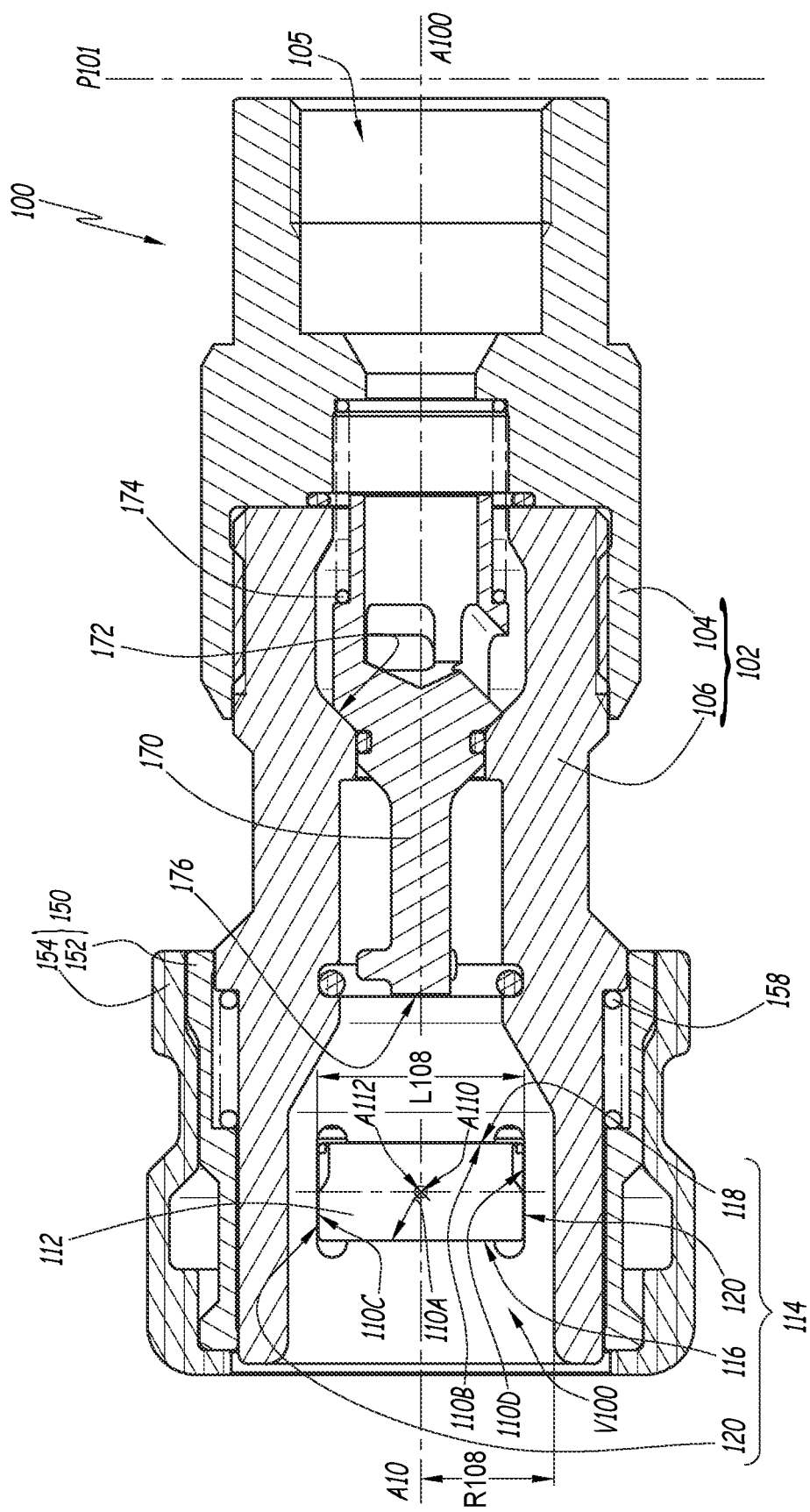
FIG. 5 is a larger-scale longitudinal section of the female element of the connector of FIGS. 1 to 4, shown in a connected configuration and according to a sectional plane V-V orthogonal to that of FIG. 1 and visible in this figure.

The second axial face 148 is configured to face the first security face 48 of the male element 10 when the male element 10 is received within the receiving volume V100 of the female element 100 and the quick connector is in a locked configuration, as illustrated in FIG. 4 and described further below. By extension, the second axial face 148 is a second security face for the latch 112.

The second inner portion 140 also comprises a second inner face 149, which is parallel to the transverse plane P112 and connects the second axial face 148 to the inner face 124 of the latch 112. The second inner face 149 is further from the mouthpiece 108 of the female element 100 than the second outer face 144.

Each latch 112 is received in a respective radial opening 110 and is translatable in relation to the body 102 of the female element 100 along the corresponding radial axis A110 between a first position, in which such latch 112 enters the receiving volume V100, and a second position, in which such latch 112 does not enter the receiving volume V100.

The movements of each of the latches 112 are controlled by a actuating ring 150, which belongs to the female element 100.

The actuating ring 150 has a generally rotational shape about a ring axis A150. In the assembled configuration of the female element 100, the actuating ring 150 is arranged around the body 102 coaxially with the insertion axis A100, i.e. the ring axis A150 is coincident with the insertion axis A100.

Here, the actuating ring 150 is formed by an assembly of an inner ring 152 and an outer ring 154. The inner ring 152 and the outer ring 154 are connected to each other, here by means of screws 156.

The actuating ring 150 is translatable in relation to the body 102 of the female element 100 along the insertion axis A100 between a forward position and a rear position. Here, the actuating ring 150 defaults back to the front of the female element 100 by a compression spring 158, which acts between two opposing faces of the actuating ring 150 and the body 102.

The inner ring 152 is shown independently of the outer ring in FIGS. 7 and 8. The inner ring 152 comprises guide grooves 160 that interact with each latch 112 so as to guide the movements of each latch between its first position and its second position when the actuating ring 150 is moved between its forward and rear positions.

For each latch 112, the inner ring 152 also comprises a radial passage 162, each radial passage 162 being centered on a passage axis A162, which is radial to the ring axis A150, each radial passage 162 having a substantially rectangular cross-section, in a plane orthogonal to the passage axis A162.

Each radial passage 162 is configured to receive a respective latch 112 without interfering with the latch movements when the actuating ring 150 is moved between its forward and rear positions, and the latch 112 is moved between its first and second positions.

In the illustrated example, two guide grooves 160 are associated with each radial passage 162, with these two guide grooves 160 opening through an opening 163 in the radial passage 162, while another opposite end is a bottom 164 of this guide groove 160.

Each groove 160 comprises two walls 166 located opposite each other that are connected by the bottom 164. Here, the walls 166 are parallel to each other, with a distance between the walls 166 being slightly larger than a diameter of the pins 134 of the latches 112, so as to guide the pins 134 into the guide grooves 160.

The guide grooves 160 associated with a radial passage 162 are thus associated with a latch 112. The guide grooves 160 associated with each latch 112 are geometrically carried by a guide plane P160.

The guide plane P160 and the insertion axis A100 form an angle of inclination α160 with each other, which is conventionally considered to be equal to 90° when the guide plane P160 is orthogonal to the insertion axis A100, and equal to 0° when the guide plane P160 is parallel to the insertion axis A100.

Each guide plane P160 is inclined in relation to the insertion axis A100. Inclined means that the guide plane P160 is neither parallel nor orthogonal to the insertion axis A100. In other words, the angle of inclination α160 is neither zero nor equal to 90°.

Here, each guide plane P160 is inclined forward, i.e. the guide grooves 160 move away from the insertion axis A100 as they approach the front of the female element 100, when the female element 100 is assembled.

When the female element 100 is assembled, each latch 112 is received in a respective radial opening 110 and respective radial passage 162 and is guided in translation along the radial axis A110. The pins 134 are received in the guide grooves 160, which are inclined. Thus, when the actuating ring 150, which is integral with the inner ring 152, is moved toward the front of the female element 100, each latch 112 is moved closer to the insertion axis A100 until the pins 134 come to rest against the bottom 164 of the corresponding guide groove 160. Here, the forward position of the actuating ring 150 is thus a locked position of the actuating ring 150, with the compression spring 158 being arranged to push the actuating ring 150 towards its locked position.

Conversely, as the actuating ring 150 is moved rear of the female element 100, each latch 112 is moved away from the insertion axis A100 by the pins 134 sliding in the guide grooves 160 away from their respective bottoms 164. Here, the rear position of the actuating ring 150 is therefore an unlocked position of the actuating ring 150.

In other words, the unlocked position of the actuating ring 150 is a position axially retracted in relation to the locked position along the insertion axis A100.

It is understood that the transmission of forces between the actuating ring 150 and the latches 112 is dependent on the angle of inclination α160.

When the angle of inclination α160 is greater than 60°, maneuvering of the actuating ring 150 becomes difficult, which is undesirable.

Conversely, when the angle of inclination α160 is less than 30°, maneuvering the actuating ring 150 is easy. However, the axial travel of the actuating ring 150 between its locking and unlocked positions increases, which is also undesirable because the female element 100 is then more cumbersome.

In practice, the angle of inclination α160 is between 300 and 60°, preferably between 400 and 50°, more preferably equal to 45°.

Advantageously, the female element 100 comprises a valve 170, which is housed in the fluid passage V100. The valve 170 is translatable along the insertion axis A100 between a closed position, in which the valve 170 abuts against a seat 172 provided in the body 102 of the male element 100 and closes the fluid passage V100, and an open position, in which the valve 170 does not close the fluid passage V100. In FIG. 1, the valve 170 is shown in the closed position.

The female element 100 also comprises a spring 174, which acts between a rear face of the valve 170 and an opposing, forward-facing face of the body 102 of the female element 100. The spring 174 biases the valve 170 toward its closed position by default.

The valve 170 comprises a second support face 176 on the side of the mouthpiece 108. The valve 170 is thus configured to move from its closed position to its open position when a force greater than the return force of the spring 174 is exerted on the second support face 176.

When the male element 10 is received in the receiving volume V100 of the female element 100, the support face 176 bears on the first bearing face 56.

The operation of the connector R is now described.

In FIG. 1, the mouthpiece 22 of the male element 10 is placed opposite the mouthpiece 108 of the female element 100, the main axis A10 being aligned with the insertion axis A100. The valve 50 of the male element 10 and the valve 170 of the female element 100 are each in the closed position.

Under the effect of the spring 158, the actuating ring 150 is pushed into its locked position. The latches 112 guided by the guide grooves 160 are then in their first position.

After removing the cap 12 from the male element 10, an operator moves the male element 10 toward the female element 100 with a press-fitting movement F1, which is a translational movement parallel to the insertion axis A100.

As the press-fitting movement continues, the distal portion 20 of the male element 10 is received in the receiving volume V100 of the female element 100.

The first support face 56 abuts the second support face 176. As the insertion movement continues, the two valves 50 and 170 push each other back towards their respective open positions, against the springs 54 and 174. The fluid passage V10 of the male element 10 is then fluidly connected to the fluid passage V100 of the female element 100.

In parallel with opening the valves 50 and 170, during the insertion movement, the flange 30 pushes the latches 112 from their first position to their second position. More specifically, the front face 32 of the flange 30, which is divergent toward the rear of the male element 10, interacts with the flared portion 128 of the latches 112, so as to push each latch 112 toward its second position, following a translational movement parallel to the radial axis A110 of the openings 110.

As the latches 112 move from their first position to their second position, the pins 134, which interact with the guide grooves 160, push the actuating ring 150 from its locked position to its unlocked position. When the latches 112 are in their second position, the actuating ring 150 is in its unlocked position.

Figure 3:
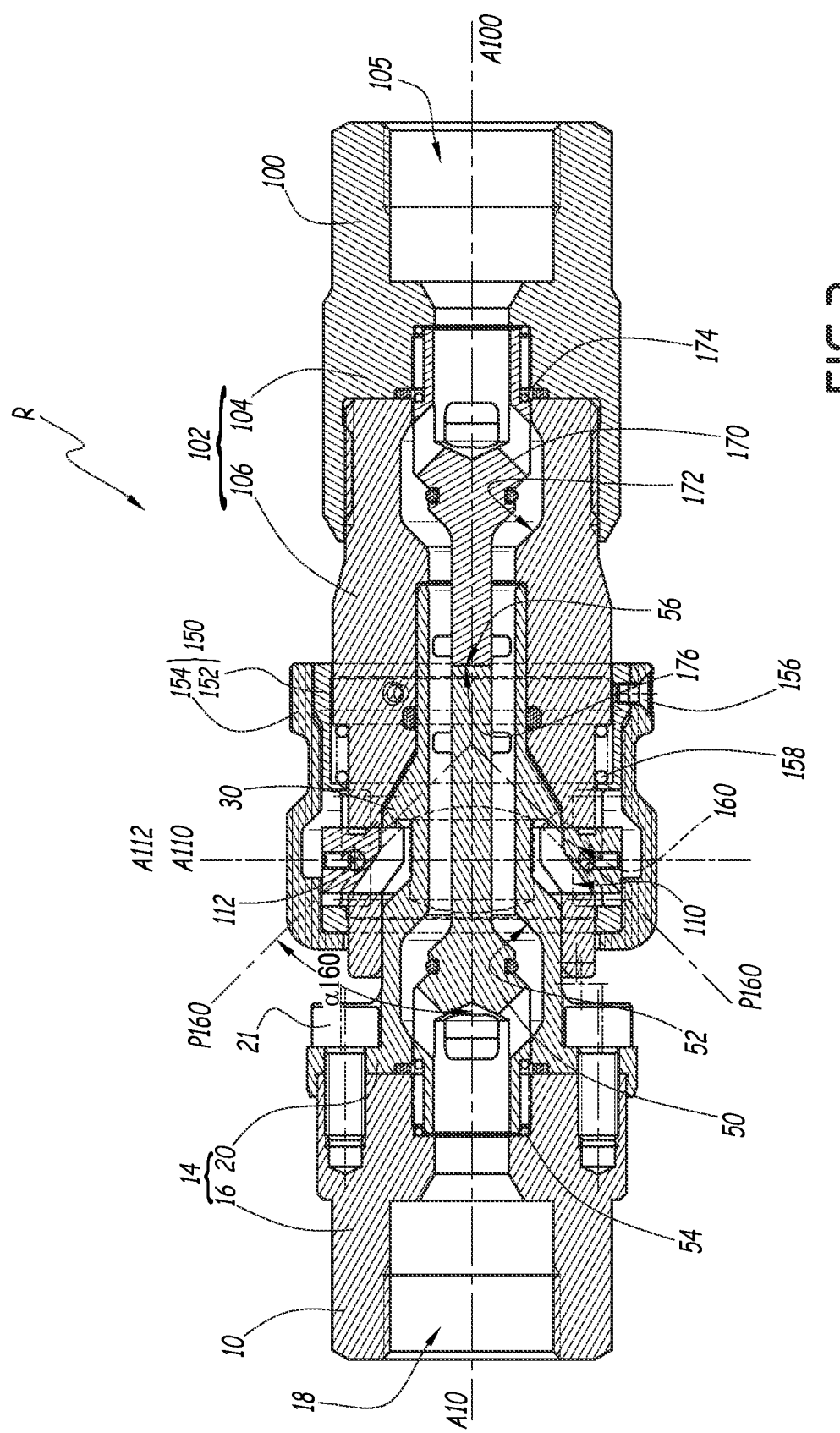
FIG. 3 is a longitudinal section of the quick connector of FIG. 1 in a second so-called pre-locking configuration.

As the push-in motion continues, each of the valves 50 or 170 comes to rest in the respective body 14 or 102. The connector R is then in the pre-lock configuration, shown in FIG. 3, in which the male element 10 is fully inserted into the female element 100, and the actuating ring 150 is in the unlocked position.

In this pre-locking configuration, the flange 30 no longer pushes the latches 112 back. The movements of the latches 112 along the radial axis 110 are then imposed by the actuating ring 150. Under the effect of the compression spring 158, the actuating ring 150 is pushed from its unlocked position to its locked position, driving the latches 112 from their second position to their first position.

Once the latches 112 are in their first position, the first outer face 40 of the flange 30 faces the second outer face 144 of the latch 112, while the first inner face 44 of the flange 30 faces the second inner face 149 of the latch 112.

Under the effect of the springs 54 and 174 of the valves 50 and 170, the male element 10 and the female element 100 are moved away from each other in a backward movement. The first outer face 40 of the flange 30 is then received in the second groove 145 of each latch 112, while the second inner face 149 of each latch is received in the first groove 42 of the flange 30.

The second groove 145 is shallower here than the first groove 42 in the rear face 34 of the flange 30. The backward movement continues until the first outer face 40 of the flange 30 comes to rest on the second outer face 144. The quick connector R is then in its connected configuration, shown in FIG. 4.

The first security face 148 belonging to the latch 112 is then facing the second security face 48 of the flange 30.

The interaction of the first security face 148 with the second security face 48 prevents the latches 112 from moving from their first position to their second position, i.e. provides a security latch of the quick connector R in addition to the latch provided by the actuating ring 150.

When the quick connector R is in the connected configuration, movements of the actuating ring 150 are prevented. In addition, when a pressurized fluid flows through the quick connector R, the fluid pressure tends to move the male element 10 away from the female element 100 in a backward motion, i.e. tends to keep the quick connector R in a connected configuration, with the latches 112 engaging the flange 30.

In a variant, not shown, the proximal face 118 of the latches 112 does not have a groove 145, i.e. the proximal face 118 is flat, as is the rear face 34 of the flange 30 of the male element 10. The connection R thus formed does not have disconnection security but has a very large contact surface between the latches and the rear face of the flange. When the fluid flows through the connector R under very high pressure, the repelling force between the male and female elements does not generate any significant contact pressure that could lead to premature wear of the latches or the collar of the male element.

To disconnect the male element 10 from the female element 100, the user moves the male element 10 toward the female element 100 in a first phase according to the insertion movement, until the first and second security faces 148 and 48 are no longer facing each other. In the illustrated example, this configuration corresponds to when the valves 50 and 170 are each at the back stop, as in FIG. 3.

The movements of the latches 112 along the radial axis A110 are then controlled by the actuating ring 150. In a second phase, the user moves the actuating ring 150 from its locked position to its unlocked position, thereby moving the latches from their first position to their second position. The quick connector R is then in the pre-locking configuration of FIG. 3, in which the proximal face 118 of the latches 112 is no longer facing the rear face 34 of the flange 30. During a third phase, the user moves the male element 10 and the female element 100 away from each other along the insertion axis A100, this movement being assisted by the springs 154 and 174 of the valves 50 and 170. During this movement away, each of the valves 50 and 170 returns to rest on the corresponding seat 52 or 172, closing the respective fluid passages V10 or V100.

The elaborate kinematics of the release of the connector R in three distinct phases reduces the risks of untimely disconnection by the user. In particular, when a pressurized fluid flows through the quick connector R, the user notices, during the first phase, that the force required to bring the male element 10 and the female element 100 together is greater than the force required in the absence of pressure, thus alerting the user to the presence of pressure, this in complete security because the user has not yet moved the actuating ring 150.

When the pressure inside the connection R is high, the user cannot perform the approach movement of the first phase with his or her muscle power alone. This prevents a pressurized disconnection of the connector R.

In the second to fourth embodiments, the elements similar to those of the first embodiment have the same references and function in the same way. In the following, differences between each embodiment and the preceding embodiment(s) are primarily described.

Figure 9:
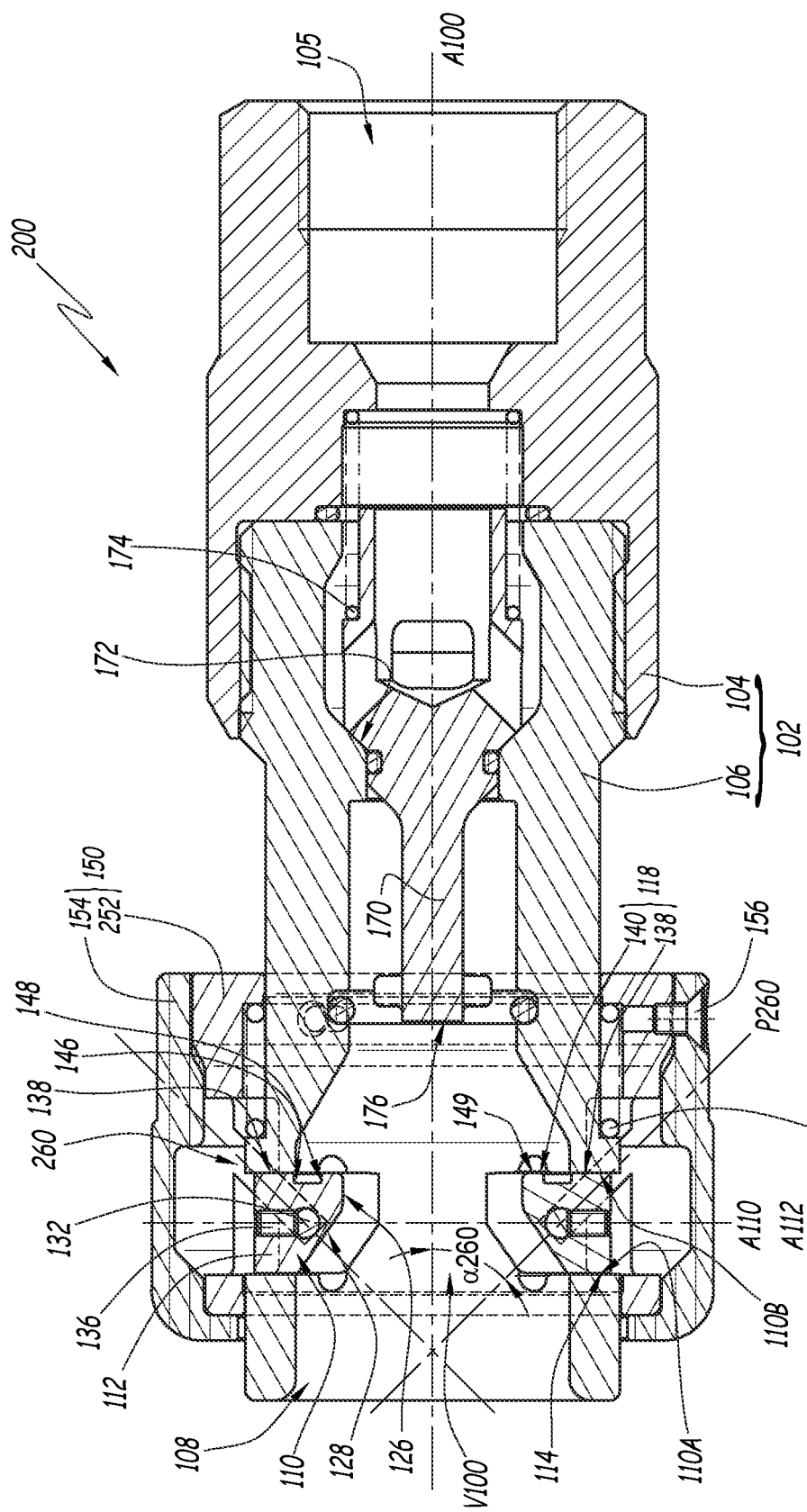
FIG. 9 is a longitudinal section of a female element according to a second embodiment of the invention, shown in a disconnected configuration, according to a sectional plane similar to that of FIG. 1.
Figure 10:
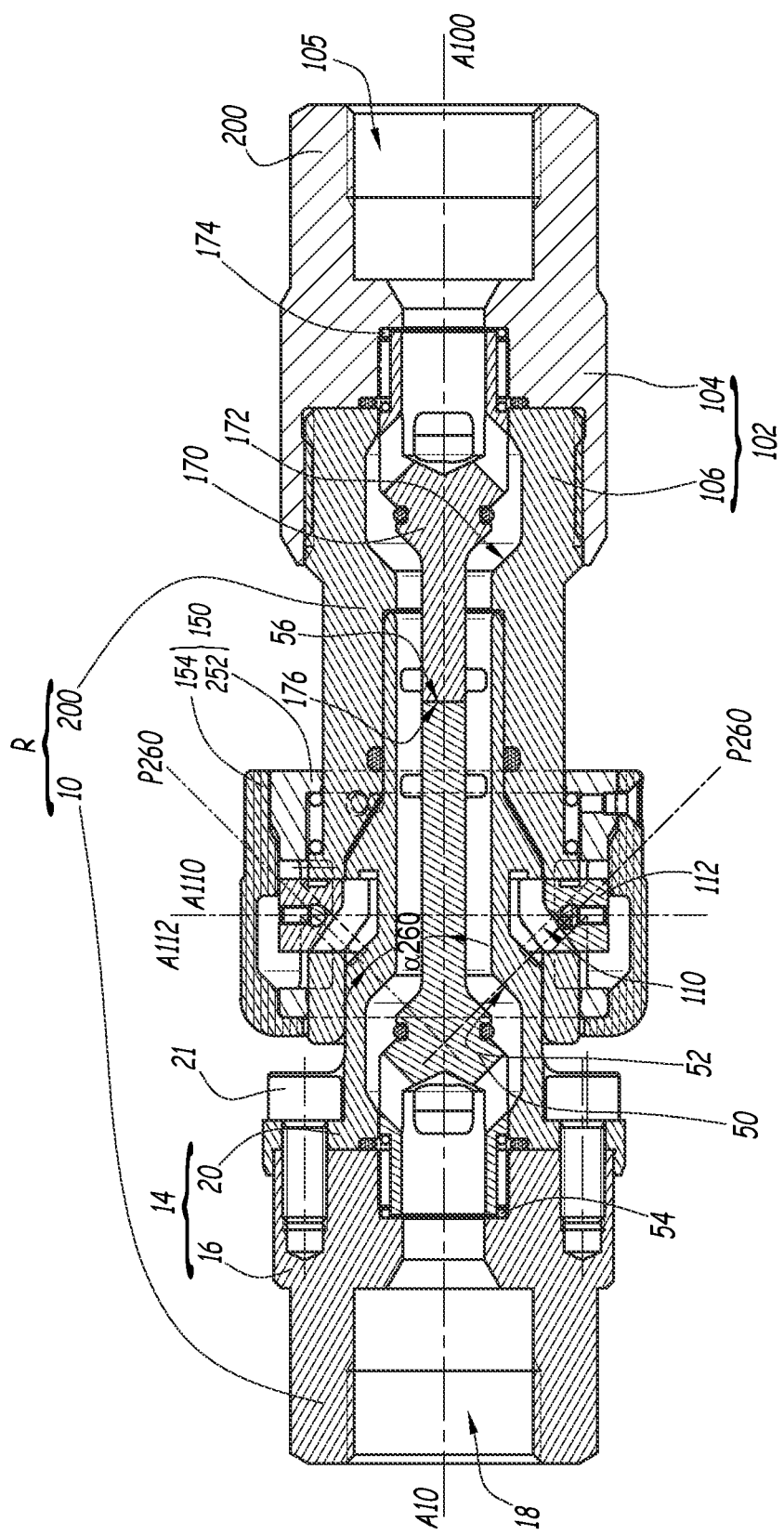
FIG. 10 is a longitudinal section of a quick connector according to the second embodiment of the invention, comprising the female element of FIG. 9 and shown in a pre-locked configuration.
Figure 11:
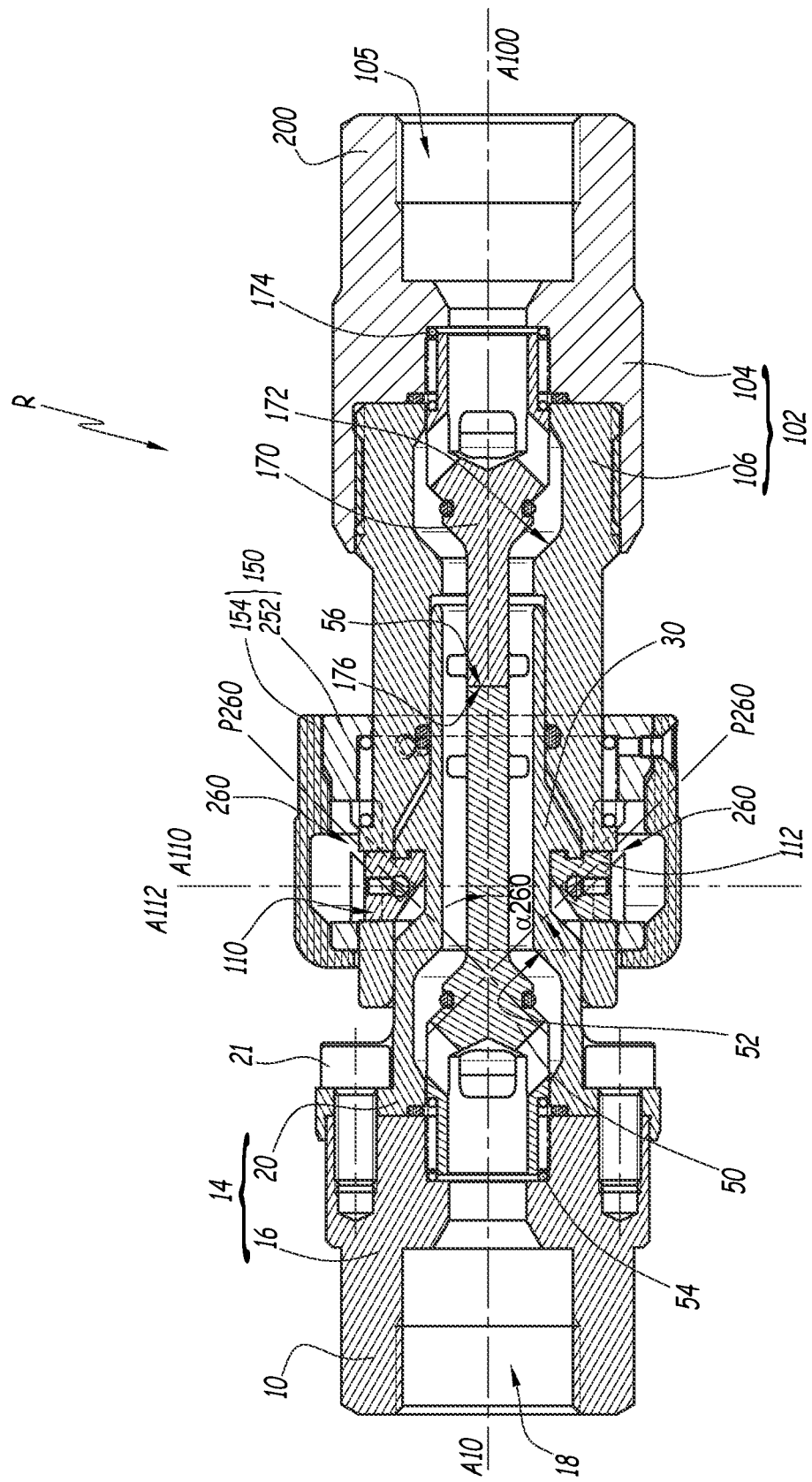
FIG. 11 is a longitudinal section of the quick connector of FIG. 10, with the connector in the connected configuration.

A female element 200 according to the second embodiment of the invention is shown in FIGS. 9 to 11. While in the first embodiment the female element 100 comprises an inner ring 152 with guide grooves 160 sloping towards the front of the female element 100, one of the main differences of the second embodiment from the first embodiment is that the female element 200 comprises an inner ring 252 that comprises guide grooves 260 that slope towards the rear of the female element 200. In other words, the guide grooves 260 move closer to the push-in axis A100 as they move toward the front of the female element 200.

When the female element 200 is assembled, each latch 112 is received in a respective radial opening 110 and a respective radial passage 162 and is guided in translation along the radial axis A110. The pins 134 forming the ends of the shaft 132 are received in the guide grooves 260. The guide grooves 260 associated with a single radial opening 110 are aligned on a guide plane P260, which is inclined backward in relation to the insertion axis A100. Each guide plane P260 forms an angle of inclination α260 with the insertion axis that is neither zero nor equal to 90°.

Thus, as the actuating ring 150 is moved to the rear of the female element 200, each latch 112 is moved closer to the insertion axis A100, until the pins 132 come into abutment against the bottom 164 of the corresponding guide groove 260. The latches 112 are then in their first position, and the actuating ring 150 is in its locked position. The female element 200 is then in a locking configuration, as in FIGS. 9 and 11. The compression spring 158 is arranged to push the actuating ring 150 into its locked position.

Conversely, when the actuating ring 150 is moved forward of the female element 200, each latch 112 is moved away from the insertion axis A100. The latches 112 are then in their second position, and the actuating ring 150 is in its unlocked position. By extension, the female element 200 is then in an unlocked configuration, shown in FIG. 10.

In other words, the locked position of the actuating ring 250 is an axially retracted position, along the insertion axis A100, in relation to the unlocked position of the actuating ring 150.

The connection of the connector R follows a similar sequence as in the first embodiment, with only the locking and unlocked positions of the ring 150 being reversed from the first embodiment.

In FIG. 10, the quick connector R is shown in its pre-locked configuration, while in FIG. 11, the quick connector is shown in its connected configuration.

When disconnecting the quick connector R, in a first phase the user moves the male element 10 towards the female element 200 parallel to the insertion axis A100, until the first and second security faces 148 and 48 are no longer facing each other. In a second step, the user moves the actuating ring 150 from its locked position to its unlocked position, in this case towards the front of the female element 200, i.e. towards the male element 10. The connector R is then in a pre-locking configuration. Finally, in a third phase, the user moves the male element 10 away from the female element 200 following the backward movement. The valves 50 and 170 each return to their closed position.

Advantageously, the female element 200 of the second embodiment remains compatible with the male element 10 of the first embodiment.

Figure 12:
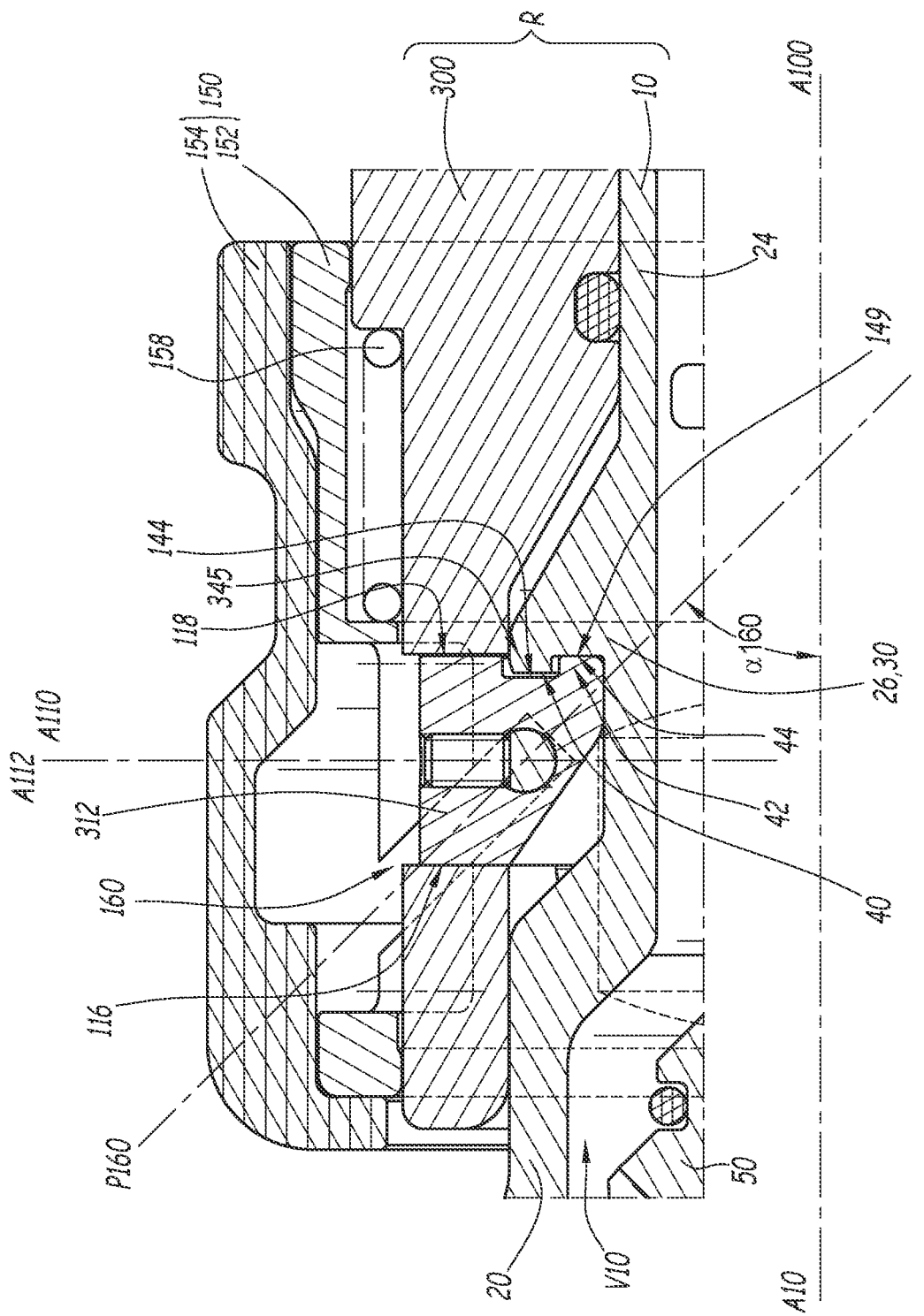
FIG. 12 is a longitudinal section showing a larger scale detail of a quick connect connector according to a third embodiment of the invention, with the connector in a connected configuration.

A third embodiment of the invention is shown in FIG. 12. A connector R, comprising a female element 300 according to the third embodiment of the invention and a male element 10, is shown in a connected configuration in FIG. 12. One of the main differences between the female element 300 and the female element 100 of the first embodiment is that in the connected configuration of the quick connector R, the latches 112 and the flange 30 abut each other via different surfaces.

The female element 300 comprises two latches 312. A second groove 345 is recessed in the proximal face 118 of each latch 312, so as to provide the second outer surface 144 and the second security surface 148. Here, the second groove 345 is deeper than the first groove 42 provided in the rear face 34 of the flange 30. In the connected configuration of the quick connector R, the bottom 44 of the flange 30, i.e. the first inner face 44, abuts the second inner face 149 of the lock 312.

Figure 13:
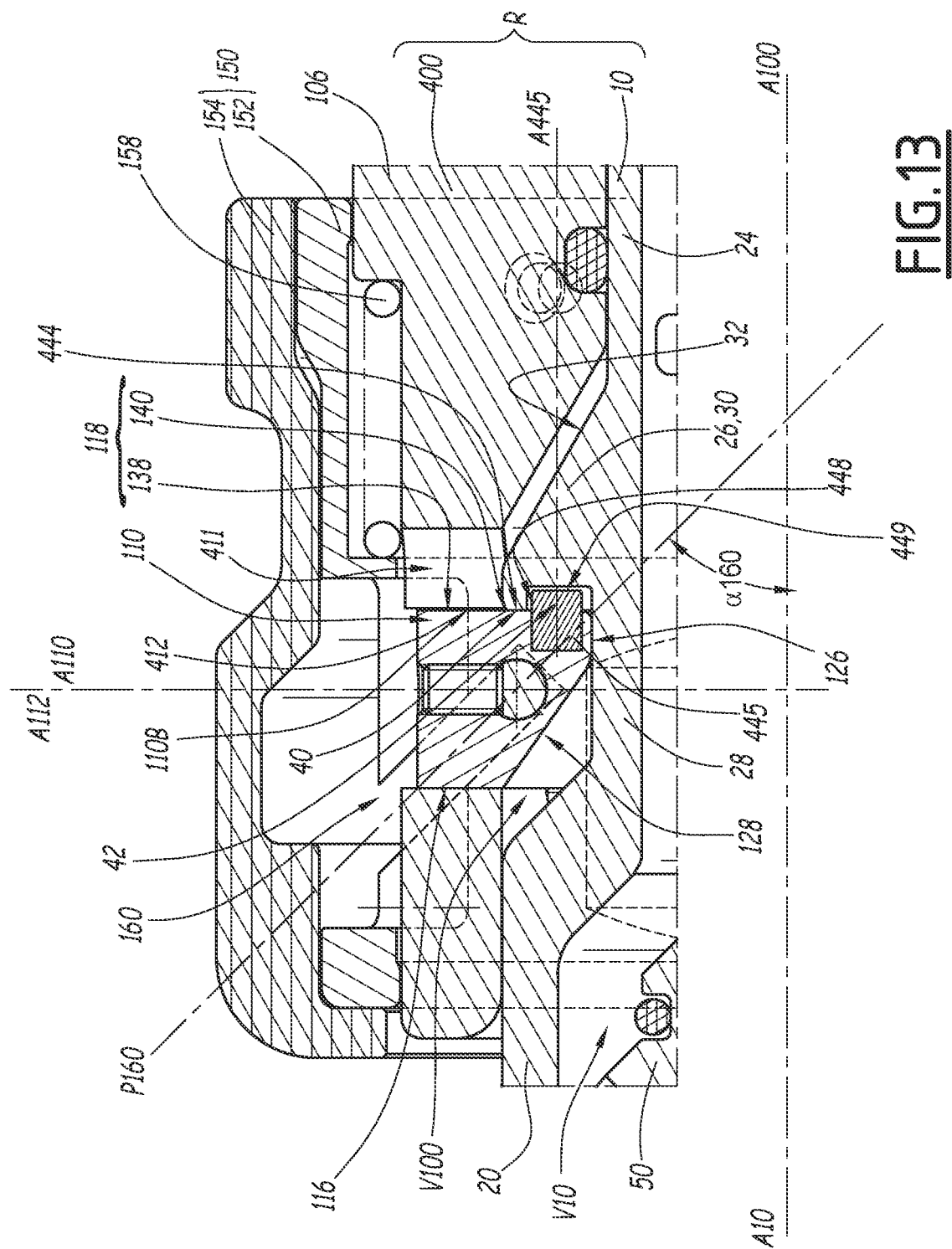
FIG. 13 is a view similar to FIG. 12 of a quick connect connector according to a fourth embodiment of the invention.
Figure 14:
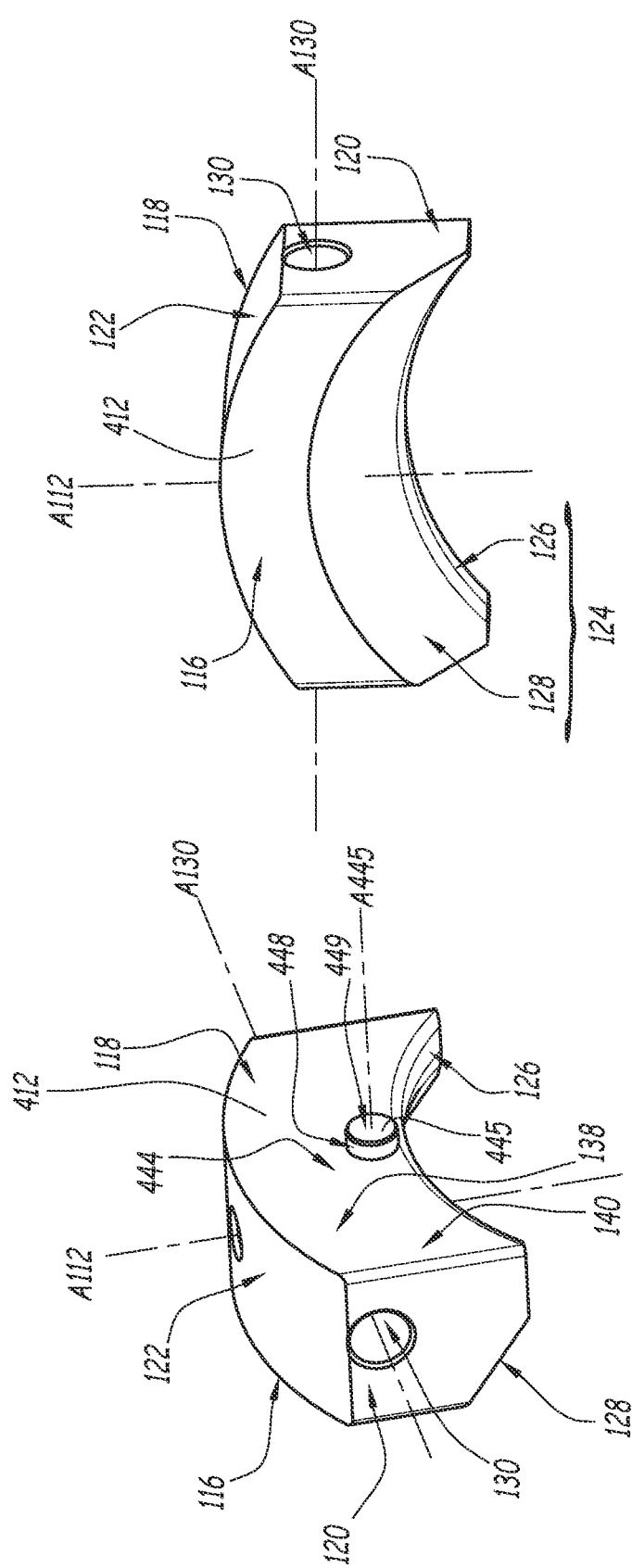
FIG. 14 is a perspective view showing a portion of the quick connect connector of Figure from two different angles 13.

A fourth embodiment of the invention is shown in FIGS. 13 and 14. A connector R, comprising a female element 400 in accordance with the fourth embodiment of the invention and a male element 10, is shown in a connected configuration in FIG. 13. Whereas in the first mode, each latch 112 comprises a second groove 145 recessed into the proximal face 118, in the fourth mode, the female element 400 comprises latches 412, each of which comprises an insert 445 that forms a projection from the proximal face 118.

For each latch 412, the insert 445 is located in the second inner portion 140 of the proximal face 118 of the latch, with the insert 445 projecting from the second outer portion 140. In the illustrated example, the insert 445 is received in a complementary recess formed in the second inner portion 140 of the proximal face 118.

Here, the insert 445 is formed by means of a cylindrical pin with a circular cross-section, which extends along an axis of the insert A445, orthogonal to the proximal face 118. The insert 445 comprises a cylindrical side face 448 and a rear face 449, which is parallel to the proximal face 118.

A portion of proximal face 118, located in the immediate vicinity of the insert 445 between the insert 445 and the outer face 122 of the latch 412 constitutes a second outer face 444 of the latch 412.

When the latch 412 is received in the corresponding radial opening 110, each insert 445 extends in a projecting manner along the insertion axis A100 in relation to the second outer portion 140. A radial groove 411 is further provided in the rear face 110B of each radial opening 110, to allow the insert 445 to pass through during movements of the latch 412 between its first position and its second position.

The lateral face 448 comprises a portion that is oriented away from the insertion axis A100, this portion constituting a second security face for the latch 412. The rear face 449, oriented away from the mouthpiece 108, constitutes a second inner face for the latch 412.

When the connector R is in the connected configuration, the insert 445 is received in the first groove 42 of the flange 30. The rear face 449 of the insert 445, otherwise known as the second inner face of the latch 412, is located opposite the first inner face 44 of the flange, while the side face 448 is opposite the first security face 48 of the flange 30, and the second outer face 444 is opposite the first outer face 40 of the flange 30.

Such a latch 412 comprising the insert 445 is easier and more economical to make than the latches 112 or 312 of the previous embodiments, in which the second grooves 145 or 345 are machined, by milling for example.

The above embodiments and variations may be combined with each other to generate new embodiments of the invention.

The invention claimed is:

1. A female element of a quick connector, configured to connect to a male element, the female element comprising:
   a body, which extends along an insertion axis and comprises:
      a receiving volume for the male element, the receiving volume having a shape of revolution about the insertion axis and opening out of the body through a mouthpiece, which is located in a transverse plane orthogonal to the insertion axis, the mouthpiece defining a front side of the female element,
      radial openings, arranged in the body along a radial axis orthogonal to the insertion axis, which open into the receiving volume,
   at least one latch, each latch being received in a respective radial opening and being movable in translation in relation to the body along the corresponding radial axis, between a first position, in which this latch penetrates into the receiving volume, and a second position, in which this latch does not penetrate into the receiving volume, each latch comprising a proximal face oriented on the side opposite the first mouthpiece,
   an actuating ring, arranged around the body coaxially to the insertion axis and movable in translation between a locked position and an unlocked position, in relation to the body along the insertion axis,
   a spring, configured to return the actuating ring to its locked position, wherein the actuating ring comprises guide grooves, which interact with pins of each latch extending in a direction orthogonal to the radial axis of the corresponding radial opening, the guide grooves associated with each latch being geometrically carried by a guide plane inclined in relation to the insertion axis, so that:
   each latch is driven from its second position to its first position when the actuating ring is moved from its unlocked position to its locked position, and
   each latch is driven from its first position to its second position when the actuating ring is moved from its locked position to its unlocked position.

2. The female element according to claim 1, wherein the guide grooves move away from the insertion axis as they approach the front of the female element, the unlocked position of the actuating ring being a position axially retracted from the locked position, along the insertion axis.

3. The female element according to claim 1, wherein the guide grooves move closer to the insertion axis as they approach toward the front of the female element, the locked position of the actuating ring being an axially retracted position in relation to the unlocked position, along the insertion axis.

4. The female element according to claim 1, wherein each guide plane is inclined in relation to the insertion axis by an angle of inclination of between 30° and 60°, preferably between 40° and 50°, more preferably equal to 45°.

5. The female element according to claim 1, wherein the proximal face of each latch is substantially planar and parallel to a transverse plane, the proximal face surface abutting a rear face of the corresponding radial opening.

6. The female element according to claim 5, wherein a width of the proximal face of each latch, equal to the length of the projection on the transverse plane of the proximal face of this latch, measured in a direction orthoradial to the insertion axis, is greater than a radius of the mouthpiece.

7. The female element according to claim 1, wherein each latch comprises an inner face, oriented toward the insertion axis, comprising a flared portion oriented both toward the insertion axis A100 and toward the mouthpiece.

8. A quick connector comprising a female element according to claim 1 and a male element, configured to be connected to said female element, wherein:
the male element comprises a hollow body with a generally revolutionary shape about a main axis, the hollow body comprising a distal portion which is intended to be received in the receiving volume of the female element, the body of the male element delimiting a fluid passage, which opens out of the distal portion via a second mouthpiece, the second mouthpiece defining a front side of the male element,
the distal portion comprises, a first cylindrical portion, a flared portion, in particular a conical portion and a second cylindrical portion moving away from the second mouth, the flared portion being arranged so as to project in relation to the first cylindrical portion and the second cylindrical portion,
the flared portion forms a flange with a front face and a rear face, of which:
the front face is oriented towards the second mouthpiece and diverges, moving away from the second mouth, the front face being configured to push each latch from its first position to its second position when the male element penetrates the female element, during a insertion movement of the male element into the receiving volume of the female element,
the rear face connects the front face to the second cylindrical portion and is oriented away from the second mouthpiece,
when the quick connector is in a connected configuration in which the male element is received in the receiving volume of the female element, the insertion axis is coincident with the main axis, the actuating ring is in the locked position and each latch is in its first position, the rear face of the flange is facing the proximal face of each latch.

9. The quick connector according to claim 8, wherein:
the rear face of the flange comprises:
a first outer portion and a first inner portion, which is radially closer to the main axis than the first outer portion and which connects the outer portion to the second cylindrical portion,
the first outer portion defines a first ring-shaped outer face centered on the principal axis and located in a plane orthogonal to the principal axis,
the first inner portion comprises a first groove, which is recessed in the first inner portion and comprises a bottom and two radial edges facing each other,
the bottom of the first groove defines a first ring-shaped inner face centered on the main axis and situated in a plane orthogonal to the main axis,
the one of the two radial edges that connects the first inner face and the first outer face defines a first security face, which is geometrically carried by a cylinder of circular cross-section centered on the main axis and which is oriented towards the main axis,
the proximal face of each latch has a profile complementary to the rear face of the flange and comprises a second outer face, a second inner face and a second security face, of which:
the second outer face has a ring portion shape centered on the insertion axis and located in a plane orthogonal to the insertion axis,
the second inner face is located in a plane orthogonal to the insertion axis and set back from the second outer face in relation to the mouthpiece of the female element,
the second security face is located between the second outer face and the second inner face and is oriented opposite the insertion axis,
when the quick connector is in its connected configuration:
the first outer face faces the second outer face,
the first inner face faces the second inner face,
when either the first outer face or the first inner face abuts the respective second outer or inner face located opposite, then the first security face is opposite the second security face, preventing the latches from moving from their first position to their second position.

10. The quick connector according to claim 9, wherein, for each latch,
a second groove is recessed in the second inner portion of the proximal face, the second groove comprising a bottom and two radial edges located opposite each other, the bottom of the groove having the ring-shaped portion centered on the insertion axis when the latch is in its first position, while the two edges each have the shape of a cylinder portion with a circular cross-section centered on an axis parallel to the insertion axis,
the bottom defines the second inner face, while the one of the two radial edges that is oriented away from the insertion axis defines the second security face, and
when the quick connector is in a connected configuration, the second outer face abuts the first outer face.

11. The quick connector according to claim 9, wherein, for each latch:
a second groove is recessed in the second inner portion of the proximal face, the second groove comprising a bottom and two radial edges located opposite each other, the bottom of the groove having the ring-shaped portion centered on the insertion axis when the latch is in the first position, while the two edges each have the shape of a cylinder portion with a circular cross-section centered on an axis parallel to the insertion axis,
the bottom defines the second internal face, while the one of the two radial edges that is oriented away from the insertion axis defines a second security face,
when the quick connector is in a connected configuration, the second inner face abuts the first inner face.

12. The quick connector according to claim 9, wherein, for each latch:

an insert is located in the second inner portion of the proximal face of the latch, the insert projecting from the second outer portion, the insert has a side face facing away from the insertion axis and a rear face facing away from the mouthpiece of the female element, the side face of the insert is the second security face of the latch, while the rear face of the insert is the second inner face of the latch.

\* \* \* \* \*